United States Patent
Heux et al.

(10) Patent No.: US 6,967,027 B1
(45) Date of Patent: Nov. 22, 2005

(54) MICROFIBRILLATED AND/OR MICROCRYSTALLINE DISPERSION, IN PARTICULAR OF CELLULOSE, IN AN ORGANIC SOLVENT

(75) Inventors: Laurent Heux, Saint-Martin d'Uriage (FR); Celine Bonini, Grenoble (FR)

(73) Assignee: Centre National de la Recherche Scientifique, (FR)

( * ) Notice: Subject to any disclaimer, the term of this patent is extended or adjusted under 35 U.S.C. 154(b) by 109 days.

(21) Appl. No.: 10/018,326

(22) PCT Filed: Jun. 13, 2000

(86) PCT No.: PCT/FR00/01628

§ 371 (c)(1),
(2), (4) Date: Jan. 8, 2002

(87) PCT Pub. No.: WO00/77088

PCT Pub. Date: Dec. 21, 2000

(30) Foreign Application Priority Data

Jun. 14, 1999 (FR) .................................. 99 07493

(51) Int. Cl.⁷ ............................ A61K 9/14; A61K 9/50
(52) U.S. Cl. ...................... 424/488; 424/484; 424/485; 424/489; 424/499
(58) Field of Search .................. 424/488, 484, 424/485, 439, 489, 499

(56) References Cited

U.S. PATENT DOCUMENTS 5,769,934 A * 6/1998 Ha et al. .................. 106/162.8
6,231,657 B1 * 5/2001 Cantiani et al. .......... 106/162.8

FOREIGN PATENT DOCUMENTS

| EP | 0120471 | 10/1984 |
| WO | WO-9622080 | 7/1996 |
| WO | WO9622080 | * 7/1996 |
| WO | WO9622696 | * 8/1996 |
| WO | WO-9622696 | 8/1996 |

OTHER PUBLICATIONS

Stanka Kratohvil et al., "Coagulation of Mycrocrystalline Cellulose Dispersions" pp. 187-193 Apr. 1, 1968.

* cited by examiner

*Primary Examiner*—Carlos A. Azpuru
(74) *Attorney, Agent, or Firm*—Muserlian, Lucas and Mercanti

(57) ABSTRACT

The invention concerns a colloidal dispersion, in an organic solvent, of a microfibrillated and/or microcrystalline particles of a fibrillated organic substance selected among the group consisting of cellulose, chitin, polysaccharides such as $\beta 1 \rightarrow 3$ glucan, $\beta 1 \rightarrow 3$ xylan and $\beta 1 \rightarrow 4$ mannan, further containing a compound having a hydrophilic part and a hydrophobic part.

16 Claims, 2 Drawing Sheets

MICROFIBRILLATED AND/OR MICROCRYSTALLINE DISPERSION, IN PARTICULAR OF CELLULOSE, IN AN ORGANIC SOLVENT

This application is a 371 of PCT/FR00/01628 filed Jun. 13, 2000.

The present invention relates to a dispersion of microfibrils and/or of microcrystals, especially of cellulose, in an organic solvent.

Native cellulose occurs in the form of microcrystals and/or of very elongated microfibrils, often organized as fibres. This cellulose can be found in plants, but also in certain fungi, bacteria, amoebae and even some marine animals.

Acid hydrolysis of cellulose in an aqueous medium leads to stable aqueous colloidal suspensions of individual microcrystals [1].

Treatment of primary or secondary plant walls in a homogenizer also makes it possible to obtain stable aqueous suspensions of microfibrils and/or of microcrystals of cellulose that are more or less separate. Description of the production of these suspensions of cellulose in water forms the subject of numerous patents [2, 3].

More particularly, we talk of microcrystals in the case of individual crystallites resulting from acid hydrolysis and, of microfibrils in the case of a treatment of homogenization of primary or secondary walls of plants. In both cases it is a question of elongated crystals of cellulose in which the macromolecular chains are aligned relative to the crystal's major axis.

Depending on the origin of the cellulose, the lateral dimensions of the microcrystals and/or microfibrils can vary from 2 nm to 50 nm. The lengths of the said microcrystals and/or microfibrils can greatly exceed one micron.

Depending on the origin of the cellulose (for example cotton) and the concentrations used (for example high concentrations, varying between 2 and 10% w/w), stable colloidal dispersions of cellulose in water are organized in the form of a liquid crystal of the cholesteric type [4], the spacing of which can vary from 80 to 10 $\mu$m, depending on the operating conditions employed [5].

In the case of microfibrillar cellulose (beet parenchyma for example), we do not observe a mesophase (organization as a liquid crystal), but the formation of gels having very good rheological properties [6]. The ranges of concentrations for which a suspension of microfibrils and/or of microcrystals becomes a gel vary depending on the origin and the purification treatment, but are of the order of 1% of dry matter.

The fields of application of cellulose microcrystals and/or microfibrils are very varied. The following applications may be noted in particular:

Manufacture of composites: most of the synthetic polymers are only soluble in organic solvents; thus, the application of cellulose microcrystals and/or microfibrils is limited to latex [7] or to water-soluble resins [26], and for example to cellulose acetate in the case of surface-modified microcrystals [15].

Thickener: just as in the case of composites, applications as thickener are limited to aqueous media; thus, we may mention the use of cellulose microfibrils and/or microcrystals for the production of oil-field drilling fluid (drilling muds) [9], or for improving processed foodstuffs [12].

We may also mention the use of cellulose microcrystals and/or microfibrils for making paper with variable optical properties [8], for the preparation of cosmetic or dermatological compositions [10], for the manufacture of descaling formulations [11], and in the field of pharmacy, personal hygiene products and foodstuffs [13].

All of the properties and applications of cellulose microcrystals and/or microfibrils mentioned above are due to the very high form factor of these objects (i.e. the ratio of length to width is high, typically over 10), and to their good dispersion in the usage medium.

However, until now it has only been possible to obtain dispersions of cellulose microfibrils and/or microcrystals in water or in very polar solvents (glycerol, ethylene glycol, DMSO etc.) [14].

In fact, when we try to disperse cellulose microcrystals and/or microfibrils in organic solvents, especially apolar ones (toluene, cyclohexane etc.) or solvents that are slightly polar, there is very rapid flocculation of the cellulose, until very large aggregates are formed, which sediment in the solvent. Aggregation mainly arises from the hydrophilic nature of cellulose, which promotes interactions between microcrystals and/or between microfibrils by hydrogen bonds and hampers interactions with the solvent.

One possible approach for making cellulose microcrystals and/or microfibrils compatible with an organic solvent is chemical modification of the surface of the cellulose to make it hydrophobic and thus compatible with the medium into which it is to be transferred.

However, this technique of chemical modification is difficult to implement. In fact, as we only wish to modify the surface of the cellulose while preserving the structure, the crystallinity and the state of dispersion, chemical modification has to be carried out in a controlled manner. Thus, it has been possible to obtain surface-modified cellulose microfibrils for which at least 25% of the hydroxyl groups present on the surface of the microfibril are esterified by acetic acid [15]. This surface modification of cellulose by acetylation only permits a priori dispersion in fairly polar media and, in the case cited, only permits dispersion of microcrystals of acetylated cellulose in cellulose acetate, to produce composite materials.

Thus, the techniques of chemical modification are still little developed and are difficult on this type of substrate, and as things stand at present they do not permit the dispersion of cellulose in organic solvents, and especially apolar or slightly polar organic solvents.

Furthermore, stable dispersions of cellulose microcrystals and/or microfibrils in an aqueous phase are of such a nature that, once dried, the said cellulose microcrystals obtained from these dispersions can no longer be redispersed owing to the irreversibility of the formation of hydrogen bonds between the microcrystals and/or microfibrils.

Several patents relate to surface modification [17] of these cellulose microcrystals and/or microfibrils or to addition of an additive [18, 19]. More particularly, the said patents [17, 18 and 19] relate to preparations of cellulose microfibrils and/or microcrystals that can be redispersed in water after drying. However, the preparations of cellulose microfibrils and/or microcrystals described in the said patents [17, 18 and 19] cannot be redispersed in organic solvents.

Chitin also occurs in the form of microcrystals and/or microfibrils.

Chitin is a structural polymer that occurs in the shell of insects and Crustacea, and in certain fungi and microorganisms, its chemical structure being that of a polysaccharide consisting of $\beta 1 \rightarrow 4$-linked N-acetyl-D-glucosamine residues.

Just as for cellulose, acid hydrolysis of chitin in an aqueous medium leads to stable aqueous colloidal suspensions of individual microcrystals [1].

The crystallites of chitin, just like those of cellulose, can also be organized in the form of a liquid crystal of the cholesteric type [22].

In its microcrystalline form, the said polysaccharide has essentially been the subject of university publications [1, 22]. In addition, there is a patent [23] that describes the preparation of chitin powder with the aid of phosphoric acid.

Regarding the production and treatment of aqueous dispersions of microcrystals and/or microfibrils of chitin, the only difference from aqueous dispersions of microcrystals and/or microfibrils of cellulose is that colloidal stabilization is due to partial deacetylation on the surface of the chitin to chitosan. The presence of $NH_3^+$ groups ensures that flocculation does not occur.

So far, however, only aqueous dispersions of chitin can be obtained, or dispersions in very polar solvents (glycerol, ethyleneglycol, DMSO etc.).

Polysaccharides such as β1→3 glucan, β1→3 xylan and β1→4 mannan have in common a fibrillar structure similar to that of cellulose or of chitin. Thus, the said polysaccharides also occur in the form of microcrystals and/or microfibrils [24, 25].

So far, however, only aqueous dispersions of polysaccharides such as β1→3 glucan, β1→3 xylan and β1→4 mannan can be obtained.

One of the aims of the present invention is to supply suspensions or dispersions of microfibrils and/or of microcrystals, especially of cellulose or of any other fibrillar organic substance, in the organic solvents for which the said suspensions or dispersions had until now been impossible to produce.

Another aim of the present invention is to supply stable suspensions or dispersions of cellulose microfibrils and/or microcrystals in organic solvents, especially apolar or slightly polar ones, without chemical modification of the cellulose.

Another aim of the present invention is to supply aqueous dispersions or suspensions of microcrystals and/or microfibrils, especially of cellulose, which once they have been dried could be redispersed in water or in an organic solvent, while preserving their properties connected with dispersion.

The present invention relates to a colloidal dispersion, in an organic solvent, of microfibrils and/or of microcrystals of a fibrillar organic substance chosen from the group comprising cellulose, chitin, and polysaccharides such as β1→3 glucan, β1→3 xylan and β1→4 mannan, in addition containing at least one compound possessing a hydrophilic part and a hydrophobic part.

The present invention relates, generally, to any fibrillar organic substance that is in the form of microcrystals and/or microfibrils that forms, in an organic solvent and outside of the scope of the invention, rapid flocculation until aggregates of a large size are obtained, which sediment in the organic solvent.

Now it was found according to the invention that the presence of a compound possessing a hydrophilic part and a hydrophobic part made it possible to obtain non-flocculent dispersions of microcrystals and/or of microfibrils of the said organic substances in organic solvents.

The expression "colloidal dispersion" denotes a dispersion of solid particles in a liquid medium, the particles having characteristic sizes varying from about 1 nm to 1000 nm.

Hereinafter, the expression "colloidal dispersion" has the same meaning as the expression "colloidal suspension".

The expression "microfibril" means that we are dealing with an extremely long, slender element made up of macromolecular chains aligned in the direction of the fibre. The said microfibrils are in the form of filaments.

As an example, in the case of polysaccharides, the said element has a diameter varying from 2 to 50 nm and a length greater than 1 μm.

The expression "microcrystals" means that we are dealing with crystals of microscopic size consisting of macromolecular chains oriented in the direction of the fibre.

In the case of polysaccharides, the microcrystals have diameters varying from 2 to 50 nm and lengths of the order of a micron, and are in the form of rods.

The essential difference between the microfibrils and/or the microcrystals is that the latter are of a finite size (generally below 1 μm) whereas the microfibrils can be very long.

The microfibrils and/or microcrystals of cellulose according to the invention can be of any origin, for example of plant, bacterial, animal, fungal or amoebic origin.

As an example of animal sources of cellulose, we may mention the animals of the Tunicata family.

Examples of plant sources of cellulose are wood, cotton, flax, ramie, certain algae, jute, food-processing wastes and the like.

Chitin microfibrils and/or microcrystals may be of animal or fungal origin.

As examples of animal sources, we may mention the Crustacea (crabs, prawns, lobsters etc.), and certain insects (cockchafers, beetles etc.).

As examples of fungal sources of chitin, we may mention fungi and yeasts.

Microfibrils and/or microcrystals of polysaccharides, such as β1→3 glucan, β1→3 xylan and β1→4 mannan, may be of plant or fungal origin.

As an example of a plant source, we may mention in particular, for β1→3 xylan, certain algae [24]. For β1→4 mannan we may also mention certain algae, as well as the endosperm of seeds of terrestrial plants [25].

As examples of fungal sources of polysaccharides, we may mention in particular, for β1→3 glucan, certain fungi and certain yeasts [24].

The production of microfibrils and/or of microcrystals of polysaccharides, such as β1→3 glucan, β1→3 xylan and β1→4 mannan, from natural elements depends on the manner of treatment and purification.

An advantageous colloidal dispersion according to the invention is characterized in that the compound possessing a hydrophilic part and a hydrophobic part is selected from the group consisting of a surfactant, a stabilizing polymer, a co-surfactant or their mixtures, and especially a mixture of surfactant and co-surfactant.

When the compound possessing a hydrophilic part and a hydrophobic part is a surfactant and/or a stabilizing polymer, the said compound can be used alone, or mixed with a co-surfactant.

When the compound possessing a hydrophilic part and a hydrophobic part is a cosurfactant, the latter is always used with a surfactant and/or a stabilizing polymer.

According to the invention, the expression "stabilizing polymer" also encompasses the expression "stabilizing copolymer".

According to an advantageous embodiment, the invention relates to a colloidal dispersion as defined above of cellulose microfibrils and/or microcrystals in an organic solvent.

According to another advantageous embodiment, the colloidal dispersion is characterized in that the organic solvent has a dielectric constant less than or equal to about 37.5, and/or in that the organic solvent is selected from the group comprising:
- aliphatic hydrocarbons having from about 5 to about 20 carbon atoms, in particular pentane, hexane, heptane, octane, dodecane or cyclohexane,
- aromatic hydrocarbons, especially xylene, toluene or decalin,
- chlorine-containing solvents, especially chloroform, dichloromethane, carbon tetrachloride, dichloroethane,
- ketones having from about 3 to about 10 carbon atoms, in particular acetone or methyl ethyl ketone,
- polymerizable vinylic compounds, especially the methacrylates and acrylates of alkyls having from about 1 to about 10 carbon atoms, styrene, vinyl acetate,
- epoxides, especially those with an aliphatic chain having from about 1 to about 10 carbon atoms, and/or an aromatic chain, diepoxides, triepoxides and/or tetraepoxides,
- primary, secondary or tertiary amines, especially those with an aliphatic chain having from about 1 to about 10 carbon atoms and/or an aromatic chain, diamines, triamines or tetramines,
- alkyl acetates having from about 1 to about 10 carbon atoms, especially methyl, ethyl, propyl or butyl acetates,
- ethers with an alkyl chain having from about 1 to about 20 carbon atoms or an aromatic chain such as ethyl ether or benzyl ether,
- aldehydes, carboxylic acids and/or their acylated derivatives and anhydrides, polyacids with an alkyl chain having from about 1 to about 20 carbon atoms or an aromatic chain such as acetaldehyde, acetic acid, maleic anhydride, benzaldehyde,
- primary, secondary or tertiary alcohols, especially those with an aliphatic chain having from about 1 to about 10 carbon atoms, and/or an aromatic chain, the polyalcohols, in particular methanol, ethanol, isopropanol, butanol or benzyl alcohol,
- tetrahydrofuran (THF), pyridine, dimethylformamide (DMF), dimethylacetamide (DMAc),
- mineral and/or organic oils, of synthetic or natural origin, such as silicone oils or vegetable oils,
- or their mixtures.

The dielectric constant of a solvent can be used for measuring its polarity. Among the organic solvents with a dielectric constant less than or equal to about 37.5, we may mention in particular those selected from the group comprising dioxan, benzene, carbon disulphide, dimethoxymethane, diethylamine, phenyl oxide, piperidine, dimethoxy-1,2-ethane, quinoline, phenol, liquid ammonia, hexamethylphosphoric triamide (HMPT), diethyleneglycol, N-methyl-pyrrolidone, nitromethane or acetonitrile.

According to an advantageous embodiment, the organic solvent according to the invention is selected from the group comprising apolar or very slightly polar organic solvents, whose dielectric constant is less than or equal to about 12.4, such as tetrahydrofuran (THF), pyridine, ethyl ether, ethyl acetate, cyclohexane, toluene, acetic acid, dichloroinethane or carbon tetrachloride.

According to another advantageous embodiment, the organic solvent according to the invention is selected from the group comprising the more polar solvents, whose dielectric constant is greater than or equal to 20.7, such as acetone, methanol, ethanol or dimethylformamide (DMF).

As examples of epoxides, diepoxides, triepoxides or tetraepoxides, we may mention in particular those that can be used for the production of epoxide networks, such as the diepoxide Diglycidyl Ether of Bisphenol A.

As examples of diamines, triamines or tetramines, we may mention in particular those that can be used as hardener in the production of epoxide networks, such as the diamine DiaminoDiphenylMethane (DDM).

The organic solvents listed above are only given as examples, and in no way limit the present invention. Thus, in general, any organic solvent that can be used in organic synthesis, or is capable of being polymerized, polycondensed or of serving as precursor of thermosetting resins, forms part of the invention.

According to an advantageous embodiment, in the colloidal dispersion of the invention, the quantity of cellulose varies from about 0.01 wt. % to about 50 wt. %, relative to the total weight of the dispersion.

According to an advantageous embodiment, in the colloidal dispersion of the invention, the compound that has a hydrophilic part and a hydrophobic part is:
(a) a surfactant possessing:
  - a hydrophilic part, which is capable of being adsorbed on the microfibrils and/or microcrystals of the fibrillar organic substance selected from the group comprising cellulose, chitin, and polysaccharides such as $\beta1\rightarrow3$ glucan, $\beta1\rightarrow3$ xylan and $\beta1\rightarrow4$ mannan, and containing for example oxyethylene groups,
  - a hydrophobic part, containing for example a carbon chain having at least 6 carbon atoms, aromatic or non-aromatic, and capable of interacting with the solvent,
  the said surfactant being selected in particular from the group comprising
    - cationic surfactants, for example from the family of the quaternary ammonium alkyls containing from about 1 to about 2 alkyl substituents, having from about 6 to about 20 carbon atoms, such as didecyldimethylammonium bromide,
    - anionic surfactants, for example from the polyoxyalkylenated alkarylphenol phosphoric esters, whose alkyl substituent contains from about 1 to about 12 carbon atoms, and from about 5 to about 25 oxyalkylene units having from about 1 to about 4 carbon atoms, and in particular oxyethylene, oxypropylene and oxybutylene units, for example BNA, a mixture of phosphoric acid ester and diester with an alkaryl chain, whose alkyl substituent contains 9 carbon atoms and 9 oxyethylene units,
    - amphoteric surfactants having a quaternary ammonium group and an anionic phosphoric group, for example from the family of the phospholipids, such as egg or soya lecithin,
    - neutral surfactants, for example from the family of those containing a sorbitol unit, and one to about 3 polyoxyethylene chains, one to about 3 fatty chains having from about 12 to about 30 carbon atoms, and especially 18 carbon atoms, such as polyoxyethylene (20) sorbitan trioleate,
(b) or, a stabilizing polymer possessing from about 5 to about 200 hydrophilic units and from about 10 to about 200 hydrophobic units, especially those having a molecular weight below 20000, such as ethylene oxide-propylene oxide block copolymers.

The expression "hydrophobic part capable of interacting with the solvent" signifies that the said part is chemically compatible with the solvent, in the sense of the solubility parameters. Thus, two compounds are chemically compatible when their solubility parameters are sufficiently similar, i.e. when the difference between the said solubility parameters, expressed in (calories/cm$^3$)$^{1/2}$, is less than or equal to 3.

According to another advantageous embodiment, the colloidal dispersion of the invention contains, in addition to the surfactant, a co-surfactant possessing:

a hydrophilic part that is compatible with the hydrophilic part of the compound possessing a hydrophilic part and a hydrophobic part as defined above, and especially with the hydrophilic part of the surfactant or of the stabilizing polymer as defined above, a hydrophobic part that is compatible with the hydrophobic part of the compound possessing a hydrophilic part and a hydrophobic part as defined above, and especially with the hydrophobic part of the surfactant or of the stabilizing polymer as defined above, the co-surfactant making it possible moreover for the microfibrils and/or microcrystals of the fibrillar organic substance as defined above to be rendered compatible with the organic solvent, the said co-surfactant being selected in particular from the group comprising alcohols having from about 4 to about 18 carbon atoms, carboxylic acids having from about 4 to about 18 carbon atoms, aldehydes having from about 4 to about 18 carbon atoms or amines having from about 4 to about 18 carbon atoms.

The expression "co-surfactant making it possible for the microfibrils and/or microcrystals of cellulose to be rendered compatible with the organic solvent" signifies that when the suspension or dispersion is not sufficiently stable, use of the co-surfactant makes it possible to stabilize it in certain cases.

As examples of alcohols, in particular we may mention hexanol, pentanol, heptanol, octanol, dodecanol, benzyl alcohol etc.

As examples of carboxylic acids, in particular we may mention caproic, butyric, benzoic acids etc.

As examples of aldehydes, in particular we may mention benzaldehyde, pentanal etc.

As examples of amines, in particular we may mention hexylamine, octylamine, benzylamine etc.

The compounds possessing a hydrophilic part and a hydrophobic part listed hereunder are only given as examples, and in no case do they limit the present invention. Thus, in general, any compound possessing a hydrophilic part and a hydrophobic part forms part of the invention.

An advantageous colloidal dispersion of the invention is characterized in that it contains:

cellulose microfibrils and/or microcrystals, in a quantity varying from about 0.01 wt. % to about 50 wt. % relative to the total weight of the dispersion, and especially from about 0.1 wt. % to about 30 wt. %, an organic solvent as defined above, in a quantity varying from about 50 wt. % to about 99.9 wt. % relative to the total weight of the dispersion, a surfactant as defined above, in a quantity varying from about 0.01 wt. % to about 50 wt. % relative to the total weight of the dispersion, and if necessary a co-surfactant as defined above, in a quantity varying from 0 wt. % to about 20 wt. % relative to the total weight of the dispersion.

Advantageously, the colloidal dispersion of the invention has at least one of the following properties:

it does not form aggregates (it is non-flocculent),
it is birefringent in shear,
it is stable for periods ranging from at least one minute to at least 12 months.

In the case of sedimentation of the colloidal dispersions of the invention, the properties of birefringence in shear of the said dispersions can be restored by simple mechanical agitation.

The colloidal suspensions or dispersions according to the invention exhibit all the physical characteristics of suspensions in water:

birefringence in shear, same state of dispersion as the starting aqueous suspensions, possibility of obtaining gels or liquid crystals depending on the origin of the microfibrils and/or microcrystals of the organic substances, having good rheological properties.

The criteria for verifying that the colloidal dispersion according to the invention is stable are:

observation of the individual crystallites in transmission electron microscopy, and/or birefringence in shear, and/or the formation of cholesteric phases at high concentrations (as in the case of cotton), which is only possible in the case of good dispersion of the microcrystals and/or microfibrils.

These criteria are fulfilled for all the colloidal dispersions according to the invention.

The invention also relates to a method of preparation of colloidal dispersions as defined above, characterized in that:

an aqueous dispersion of microfibrils and/or of microcrystals of a fibrillar organic substance selected from the group comprising cellulose, chitin, polysaccharides such as β1→3 glucan, β1→3 xylan and β1→4 mannan, is mixed with a compound possessing a hydrophilic part and a hydrophobic part, selected from the group comprising a surfactant, a stabilizing polymer, a co-surfactant or mixtures thereof, the said surfactant, stabilizing polymer or co-surfactant being as defined above, to obtain an aqueous colloidal dispersion of microfibrils and/or of microcrystals of the aforesaid fibrillar organic substance, (2) water is eliminated from the aqueous dispersion as obtained in the preceding stage, to obtain a dry mixture of surfactant and/or of stabilizing polymer, and possibly of co-surfactant, and a fibrillar organic substance selected from the group comprising cellulose, chitin, polysaccharides such as β1→3 glucan, β1→3 xylan and β1→4 mannan, (3) the mixture as obtained in the preceding stage is dispersed in an organic solvent until a dispersion is obtained.

According to an advantageous embodiment, the invention relates to a method of preparation of colloidal dispersions defined above, characterized in that:

(1) an aqueous dispersion of microfibrils and/or of microcrystals of cellulose is mixed with a surfactant selected from the group comprising BNA, polyoxyethylene sorbitan trioleate or didecyldimethyl ammonium bromide, the weight ratio between (a) the said surfactant and (b) the said microfibrils and/or microcrystals of cellulose varying from about 0.1:1 to about 20:1, to obtain an aqueous colloidal dispersion of microfibrils and/or microcrystals of cellulose, (2) the water is eliminated from the aqueous dispersion as obtained in the preceding stage to obtain a dry mixture of surfactant and cellulose, the said mixture containing from about 5 wt. % to about 95 wt. % of surfactant relative to the total weight of the mixture, and from about 5 wt. % to about 95 wt. % of cellulose relative to the total weight of the mixture, (3) the mixture as obtained in the preceding stage is dispersed in an organic solvent as defined above, until a dispersion of microfibrils and/or microcrystals of cellulose is obtained, for which the degree of mass adsorption between the said surfactant and the said cellulose microfibrils and/or microcrystals varies from about 0.1 to 20, and especially from about 0.1 to about 5.

The aqueous dispersions or suspensions of cellulose microcrystals, used at the start of stage (1) described above, before mixing with the compound possessing a hydrophilic part and a hydrophobic part, can be prepared by acid hydrolysis following the procedure described in several publications [1, 4]. The microfibrils are obtained by the usual methods of homogenization [2] or any other method by which it is possible to obtain non-flocculent suspensions in water.

During stage (1), the compound possessing a hydrophilic part and a hydrophobic part is mixed by simple stirring with the aqueous dispersion or suspension of microfibrils and/or microcrystals of organic substances, and especially of cellulose.

The quantities used between (a) the said compound possessing a hydrophilic part and (b) the said microfibrils and/or microcrystals, especially of cellulose, depend on the origin of the microcrystals and/or microfibrils. There is, however, a critical concentration that depends on the origin of the cellulose, below which the dispersion or suspension obtained is flocculent, which is for example about 2:1 as the mass ratio of surfactant and cellulose for cotton and about 3:1 for tunicates.

An excess of compound possessing a hydrophilic part and a hydrophobic part, especially of surfactant, does not hamper dispersion.

The initial concentration by weight of the aqueous suspensions or dispersions is not a decisive parameter and can vary from 0.1 percent to several percent. The criterion for selection is the obtaining of a suspension or dispersion whose viscosity is not too high to permit homogeneous mixing of the two substances (i.e. aqueous dispersion+compound possessing a hydrophilic part and a hydrophobic part).

Stage (2) of elimination of the water from the mixture described previously (aqueous dispersion+compound possessing a hydrophilic part and a hydrophobic part) is carried out by drying or freeze-drying. It can also be carried out by solvent exchange.

Stage (3) of dispersion in the organic solvent described previously is carried out by simple agitation or sonication of the dry mixture obtained at the end of stage (2).

The measured degrees of mass adsorption depend on the surfactant and on the origin of the microcrystals and/or microfibrils.

The method according to the invention therefore makes it possible, through the use of a compound possessing a hydrophilic part and a hydrophobic part, to disperse microfibrils and/or microcrystals, especially of cellulose, in organic solvents, especially ones that are apolar or slightly polar.

Relative to the method of chemical modification of the surface of cellulose cited previously, the method of the invention does not require a controlled chemical reaction, requiring very restricting operating conditions. According to the invention, the compounds used that possess a hydrophilic part and a hydrophobic part, in particular surfactants, can be of industrial grade; moreover, implementation of the method is very simple. The manufacturing cost of the method according to the invention is therefore well below that of the method of chemical modification known until now.

According to another embodiment, the invention also relates to a method of preparation of colloidal dispersions as defined above, characterized in that:

(a) the following compounds are mixed together:
an aqueous dispersion of microfibrils and/or microcrystals of a fibrillar organic substance as defined above,
a compound possessing a hydrophilic part and a hydrophobic part, selected from the group comprising a surfactant, a stabilizing polymer, a co-surfactant or mixtures thereof, as defined above,
an organic solvent as defined above, (b) the mixture obtained in the preceding stage is allowed to settle until there is separation of two phases: an organic phase and an aqueous phase, (c) the said organic phase is recovered, which contains the microfibrils and/or microcrystals of the said fibrillar organic substance coated with the compound possessing a hydrophilic part and a hydrophobic part, and dispersed in the organic solvent.

The aqueous colloidal dispersion of microfibrils and/or microcrystals as obtained at the end of stage (1), after mixing with the compound possessing a hydrophilic part and a hydrophobic part, is novel.

The invention therefore also relates to an aqueous colloidal dispersion of microfibrils and/or microcrystals of a fibrillar organic substance selected from the group comprising cellulose, chitin, polysaccharides such as $\beta1\rightarrow3$ glucan, $\beta1\rightarrow3$ xylan and $\beta1\rightarrow4$ mannan, characterized in that it additionally contains at least one compound possessing a hydrophilic part and a hydrophobic part selected from the group comprising a surfactant, a stabilizing polymer, a co-surfactant, or mixtures thereof, the said surfactant possessing:
a hydrophilic part, capable of being adsorbed on the microfibrils and/or microcrystals of the fibrillar organic substance selected from the group comprising cellulose, chitin, polysaccharides such as $\beta1\rightarrow3$ glucan, $\beta1\rightarrow3$ xylan and $\beta1\rightarrow4$ mannan, and containing for example oxyethylene groups,
a hydrophobic part, containing for example a carbon chain having at least 6 carbon atoms, aromatic or non-aromatic, and capable of interacting with the solvent, the said surfactant being selected in particular from the group comprising cationic surfactants, for example from the family of quaternary ammonium alkyls containing from about 1 to about 2 alkyl substituents, having from about 6 to about 20 carbon atoms, such as didecyldimethyl ammonium bromide, anionic surfactants, for example from the family of polyoxyalkylenated alkarylphenol phosphoric esters, the alkyl substituent of which contains from about 1 to about 12 carbon atoms, and from about 5 to about 25 oxyalkylene units having from about 1 to about 4 carbon atoms, and especially oxyethylene, oxypropylene and oxybutylene units, for example BNA, a mixture of ester and diester of phosphoric acid with an alkaryl chain, whose alkyl substituent contains 9 carbon atoms and 9 oxyethylene units, amphoteric surfactants possessing a quaternary ammonium group and an anionic phosphoric group, for example from the family of the phospholipids, such as egg or soya lecithin, neutral surfactants, for example from the family of those containing a sorbitol unit, and one to about 3 polyoxyethylene chains, one to about 3 fatty chains having from about 12 to about 30 carbon atoms, and especially 18 carbon atoms, such as polyoxyethylene (20) sorbitan trioleate, the said stabilizing polymer possessing from about 5 to about 200 hydrophilic units and from about 10 to about 200 hydrophobic units, especially those having a molecular weight below 20000, such as ethylene oxide-propylene oxide block copolymers, the said co-surfactant possessing:

a hydrophilic part that is compatible with the hydrophilic part of the compound possessing a hydrophilic part and a hydrophobic part as defined above, and especially with the hydrophilic part of the surfactant or of the stabilizing polymer as defined above, a hydrophobic part that is compatible with the hydrophobic part of the compound possessing a hydrophilic part and a hydrophobic part as defined above, and especially with the hydrophobic part of the surfactant or of the stabilizing polymer as defined above, and making it possible for the microfibrils and/or microcrystals of the fibrillar organic substance as defined above to be rendered compatible with the organic solvent, the said co-surfactant being selected in particular from the group comprising alcohols having from about 4 to about 18 carbon atoms, carboxylic acids having from about 4 to about 18 carbon atoms, aldehydes having from about 4 to about 18 carbon atoms or amines having from about 4 to about 18 carbon atoms.

According to an advantageous embodiment, the invention relates to an aqueous colloidal dispersion as defined above, of microfibrils and/or microcrystals of cellulose.

According to another advantageous embodiment, the aqueous colloidal dispersion is characterized in that the weight ratio between (a) the surfactant and the co-surfactant if present, and (b) the cellulose, varies from about 0.1:1 to about 20:1, and is in particular from about 1:1 to about 6:1.

An advantageous colloidal dispersion of the invention is characterized in that it contains:

microfibrils and/or microcrystals of cellulose, in a quantity varying from about 0.01 wt. % to about 50 wt. % relative to the total weight of the dispersion, a surfactant, and possibly a co-surfactant, in a quantity varying from about 0.01 wt. % to about 50 wt. % relative to the total weight of the dispersion, the said surfactant being selected in particular from the group comprising BNA, polyoxyethylene sorbitan trioleate or didecyldimethyl ammonium bromide, and the said co-surfactant being in particular hexanol, water in a quantity varying from about 50 wt. % to about 99.9 wt. % relative to the total weight of the dispersion, and/or a solvent selected from the group comprising dimethylsulphoxide, polyalcohols and especially polyethyleneglycol, glycerol.

According to an advantageous embodiment, the aqueous colloidal dispersion of microfibrils and/or microcrystals according to the invention, as obtained at the end of stage (1) of the method of preparation as described above, i.e. after mixing an aqueous dispersion of microfibrils and/or microcrystals with the compound possessing a hydrophilic part and a hydrophobic part, can, once it has been dried, be redispersed:

in water, or in an organic solvent.

According to an advantageous embodiment, the invention also relates to the use of a colloidal dispersion of microcrystals and/or microfibrils of cellulose, of chitin or of polysaccharide as defined above, for the preparation of gels, liquid crystals or materials containing cellulose microfibrils and/or microcrystals.

The organic solvent as defined above, included in the composition of the colloidal dispersions of the invention, can be thickened and/or made more viscous by adding a mixture of microcrystals and/or microfibrils of a fibrillar organic substance as defined above, and a compound possessing a hydrophilic part and a hydrophobic part as defined above.

Accordingly, the invention also relates to an organic solvent as defined above, thickened and/or viscous, characterized in that it contains:

microcrystals and/or microfibrils of a fibrillar organic substance selected from the group comprising cellulose, chitin, polysaccharides such as $\beta1\rightarrow3$ glucan, $\beta1\rightarrow3$ xylan and $\beta1\rightarrow4$ mannan, a compound possessing a hydrophilic part and a hydrophobic part selected from the group comprising a surfactant, a stabilizing polymer, a co-surfactant or mixtures thereof, the said surfactant, stabilizing polymer and co-surfactant being as defined above.

By way of example, we may mention mineral and/or organic oils, of synthetic or natural origin, of thickened and/or viscous consistency, containing microcrystals and/or microfibrils of cellulose, and a surfactant selected from the group comprising BNA, polyoxyethylene sorbitan trioleate or didecyldimethyl ammonium bromide.

The fields of application of the colloidal dispersions according to the invention, of microcrystals and/or microfibrils of cellulose, of chitin or of polysaccharide in an organic solvent, are in particular those mentioned previously regarding aqueous colloidal dispersions of microcrystals and/or microfibrils of cellulose that are already known, as well as other fields more specifically connected with dispersion in organic solvents.

Thus, with regard for example to the manufacture of composite materials, the dispersion according to the invention, of microcrystals and/or microfibrils of cellulose in organic solvents, makes it possible to extend the method of manufacture of composites to polymers that are soluble in these organic solvents, which constitute the majority of the synthetic polymers.

It is thus possible, according to the invention, to mix a solution of polymer with the dispersion of microcrystals and/or microfibrils in the same solvent and obtain a film in which the cellulose reinforcing elements are very well dispersed (see Example 4), which is one of the conditions for obtaining good reinforcement.

Another simpler manner of application consists of direct mixing, by kneading, of the polymer and the cellulose microcrystals and/or microfibrils previously coated with surfactants, which increases their compatibility, and hence their mixing with the matrix.

Finally, it is possible to obtain materials by dispersion of cellulose microcrystals and/or microfibrils in a monomer (styrene for example), then by polymerization either by radical, anionic or cationic initiation, or under the action of radiation (UV, gamma, etc.). This application can be extended to polycondensation, for example by reaction of a mixture of diacid and diamine, until a polyamide is obtained, and to the manufacture of thermosetting resins.

Owing to diamagnetic anisotropy and to the presence of a charge on the cellulose microcrystals and/or microfibrils, the materials can also be oriented in a magnetic or electric field. For a sufficiently high concentration, it is thus possible to obtain solid oriented liquid crystals.

With regard to the field of thickeners, the present invention makes it possible to extend the specific thickening properties of cellulose microcrystals and/or microfibrils to organic solvents.

Regarding the field of cosmetics, the present invention makes it possible to extend the applications of aqueous suspensions or dispersions of cellulose microcrystals and/or microfibrils to suspensions or dispersions in organic solvents.

With regard to the manufacture of films with variable optical properties, the present invention makes it possible to obtain, by means of the organic solvent, the same result as in the prior art, which permits easier drying (as in the case of ether for example).

The invention also relates to a dry mixture of surfactant and/or of stabilizing polymer and if necessary of co-surfactant, and of a fibrillar organic substance selected from the group comprising cellulose, chitin, polysaccharides such as β1→3 glucan, β1→3 xylan and β1→4 mannan.

The invention also relates to a method of preparation of the dry mixture defined above, characterized in that:

(1) an aqueous dispersion of microfibrils and/or microcrystals of a fibrillar organic substance selected from the group comprising cellulose, chitin, and polysaccharides such as β1→3 glucan, β1→3 xylan and β1→4 mannan, is mixed with a compound possessing a hydrophilic part and a hydrophobic part selected from the group comprising a surfactant, a stabilizing polymer, a co-surfactant or mixtures thereof, the said surfactant and the said stabilizing polymer being as defined previously, and the said co-surfactant being as defined previously, to obtain an aqueous dispersion of microfibrils and/or microcrystals of the aforesaid fibrillar organic substance as defined above, (2) the water is eliminated from the aqueous dispersion as obtained in the preceding stage to obtain the aforesaid mixture.

The mixture defined above can be used advantageously for the preparation of materials containing microfibrils and/or microcrystals of cellulose.

The abscissa shows the temperature expressed in degrees Kelvin (K), and the ordinate shows the elastic modulus E expressed in Pascal (Pa).

The black diamond symbol (♦) represents pure atactic polypropylene.

The black square symbol (■) represents atactic polypropylene reinforced with 6 wt. % of dispersed cellulose microcrystals or microfibrils (whiskers).

Figure 2:
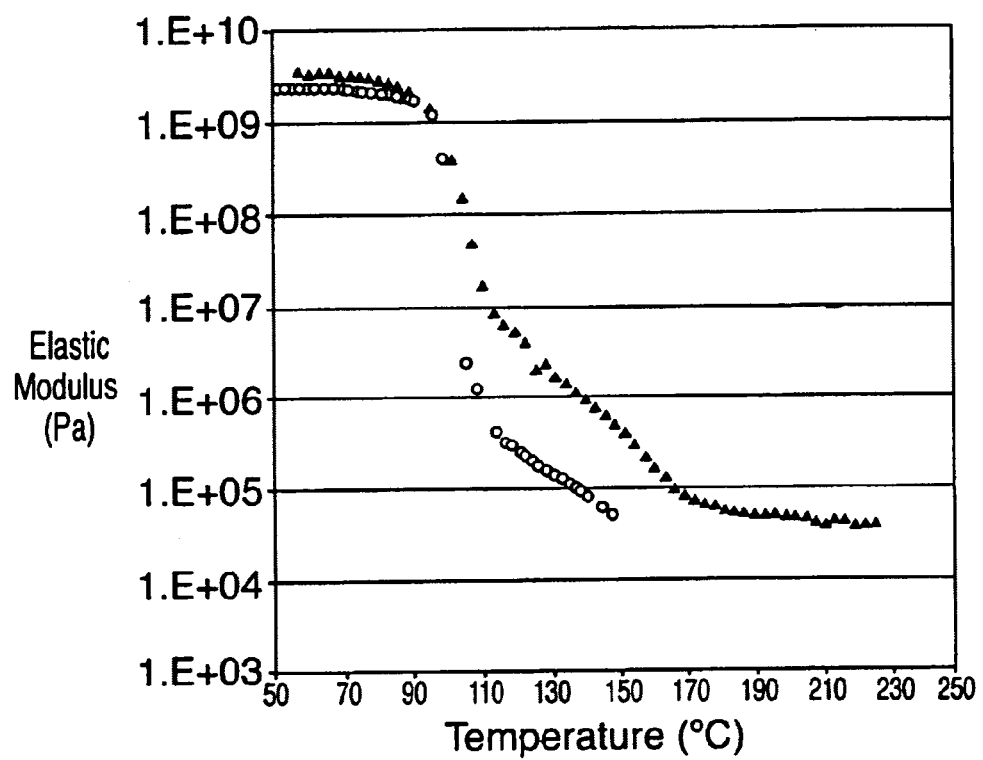

FIG. 2 shows dynamic mechanical analysis of pure polystyrene and polystyrene reinforced with 2 wt. % of microcrystals from a tunicate.

The abscissa shows the temperature expressed in degrees Celsius (° C.), and the ordinate shows the elastic modulus E expressed in Pascal (Pa).

The open circle symbol (○) represents pure polystyrene.

The black triangle symbol (▲) represents polystyrene reinforced with 2 wt. % of cellulose microfibrils and/or microcrystals.

EXAMPLES

Example 1

Preparation of a Colloidal Dispersion, Stable and Birefringent in Shear, of Microcrystals of Cellulose from Tunicates in Toluene 1) Preparation of the Aqueous Dispersion The cellulose used is a cellulose of animal origin (tunicin), extracted from the envelope of marine animals belonging to the Tunicata family.

a) First stage

The tunicates are cut up coarsely and cleaned in water. Then they are placed in a 5 wt. % potash solution overnight.

The pieces of tunicates are washed for 6 hours at a temperature of 80° C. in a mixture consisting of a solution of chlorite (17 g of $NaClO_2$ in 1 liter of distilled water), and an acetate buffer solution of pH 4.5 (27 g of soda and 75 ml of acetic acid made up to 1 liter with distilled water).

This solution, consisting of chlorite and acetate buffer, is replaced every two hours.

This operation is repeated until the pieces of tunicates are white.

This first stage permits elimination of all the organic incrustations from the walls on account of the oxidizing power of chlorine. The latter removes the proteins which are then dissolved in the potash.

b) Second stage

The tunicates are placed in a mixer for 20 minutes (20 passes of 1 minute). A flocculent aqueous dispersion is obtained.

c) Third stage: hydrolysis of the tunicates

The mixture obtained after mixing is placed in a flask in an ice bath. Add distilled water (about 200 g of ground product per 150 g of distilled water) and 95% sulphuric acid drop by drop (350 ml per 350 g of mixture of ground product and distilled water). Then heat for 30 minutes on a water bath at 80° C. All these stages are carried out with mechanical agitation to prevent overheating.

The mixture obtained is filtered on a No. 4 frit (pore diameter 5 to 15 mm). The cellulose is deposited on the filter in the form of a viscous paste. The paste is washed several times with distilled water to eliminate all traces of acid. Check that the pH is neutral. Then redisperse this paste in distilled water.

The mixture obtained is sonicated in small quantities for about 2 minutes then filtered on a No. 1 frit in order to hold back the largest aggregates.

In this way we obtain a non-flocculent aqueous dispersion of microcrystals and/or microfibrils (whiskers) of cellulose in water, at a concentration of about 0.3% w/w.

2) Suspending in Toluene a) First stage: mixing of the aqueous dispersion with the surfactant 1.2 g of the surfactant Beycostat NA, marketed by the company CECCA, consisting of a mixture of ester and diester of phosphoric acid with an alkaryl chain, in which the alkyl substituent has 9 carbon atoms and 9 oxyethylene units, is added, with vigorous stirring, to 100 ml of the 0.3% aqueous dispersion thus obtained.

For guidance, the formulae of the diester and of the ester of phosphoric acid present in BNA are given below:

monoester:

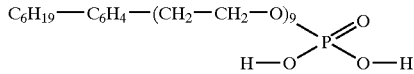

diester:

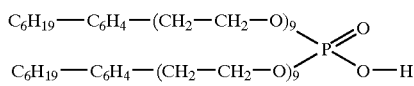

The initial pH of the aqueous dispersion or suspension mixed with the surfactant is 2. It is slowly adjusted to a value of 9 by successive additions of soda NaOH at 1% w/w in water.

b) Second stage: elimination of the water

The mixture is then freeze-dried to remove the water.

c) Third stage: dispersion in an organic solvent

The freeze-dried product is then placed in 100 ml of toluene, then redispersed for 5 min using apparatus of the Ultra-Turrax type at 12000 rev/min, then sonicated for 1 min per 20 ml batch using apparatus of the Branson Sonifier type.

The colloidal dispersion or suspension of microfibrils and/or microcrystals of cellulose obtained is transparent to the eye and exhibits, under shear between crossed polarizers, birefringence that is very apparent to the naked eye. When this operation is carried out in the same conditions at pH=2 in the aqueous dispersion, a flocculent dispersion is obtained in which the aggregates are visible to the naked eye.

Example 2

Preparation of a Colloidal Dispersion, Stable and Birefringent in Shear, of Microcrystals of Cellulose from Tunicates in Toluene 6 ml of a 6.5% w/w solution of polyoxyethylene sorbitan trioleate surfactant (marketed by the company Aldrich under the name of Tween 85) is added to 10 ml of a dispersion of microcrystals of tunicates at 0.65% w/w prepared as described in Example 1. After vigorous agitation, the mixture is freeze-dried, then redispersed in 20 ml of cyclohexane. No aggregate is visible to the naked eye; the dispersion appears to be homogeneous.

Furthermore, the colloidal dispersion of cellulose microfibrils and/or microcrystals obtained exhibits strong birefringence in shear between crossed polarizers.

Example 3

Preparation of a Colloidal Dispersion, Stable and Birefringent in Shear, of Microcrystals of Cellulose from Tunicates in Acetone 1.2 g of the surfactant Beycostat NA is added, with vigorous agitation, to 100 ml of a dispersion of microcrystals and/or microfibrils from tunicates at 0.3% w/w prepared as described in Example 1.

The initial pH of the suspension mixed with the surfactant is 2. It is adjusted slowly to a value of 9 by successive addition of soda NaOH at 1% w/w in water. The mixture is then freeze-dried to remove the water.

The freeze-dried product is then placed in 100 ml of acetone and 20 ml of hexanol (co-surfactant), redispersed for 5 min using apparatus of the Ultra-Turrax type at 12000 rev/min, then sonicated for 1 min per 20 ml batch using apparatus of the Branson Sonifier type.

The colloidal suspension of cellulose microcrystals and/or microfibrils obtained is translucent to the eye and exhibits, under shear between crossed polarizers, a birefringence that is very apparent to the naked eye.

Example 4

Preparation of a Composite Material with a Thermoplastic Matrix Reinforced by Microcrystals and/or Microfibrils (Whiskers) from Tunicates Dispersed Homogeneously A suspension at 0.3% w/w of microcrystals and/or microfibrils (whiskers) of cellulose from tunicates is prepared following the procedure described in Example 1.

100 ml of this suspension is mixed with a solution obtained by dissolving, hot, 5 g of atactic polypropylene (Aldrich) in 100 ml of toluene, with vigorous agitation.

The mixture is then submitted to evaporation under a hood for 24 h. The residual toluene is extracted by vacuum drying for 24 h at 50° C. The powder obtained is then pressed at 120° C. and 50 bar to obtain a film.

The composites thus obtained contain 6% w/w of whiskers from tunicates dispersed homogeneously in a matrix of atactic polypropylene. The modulus of the composite material is greatly increased above its glass transition temperature by the presence of whiskers from tunicates, in a similar fashion to what was demonstrated for materials obtained starting from dispersions in water [20].

Figure 1:
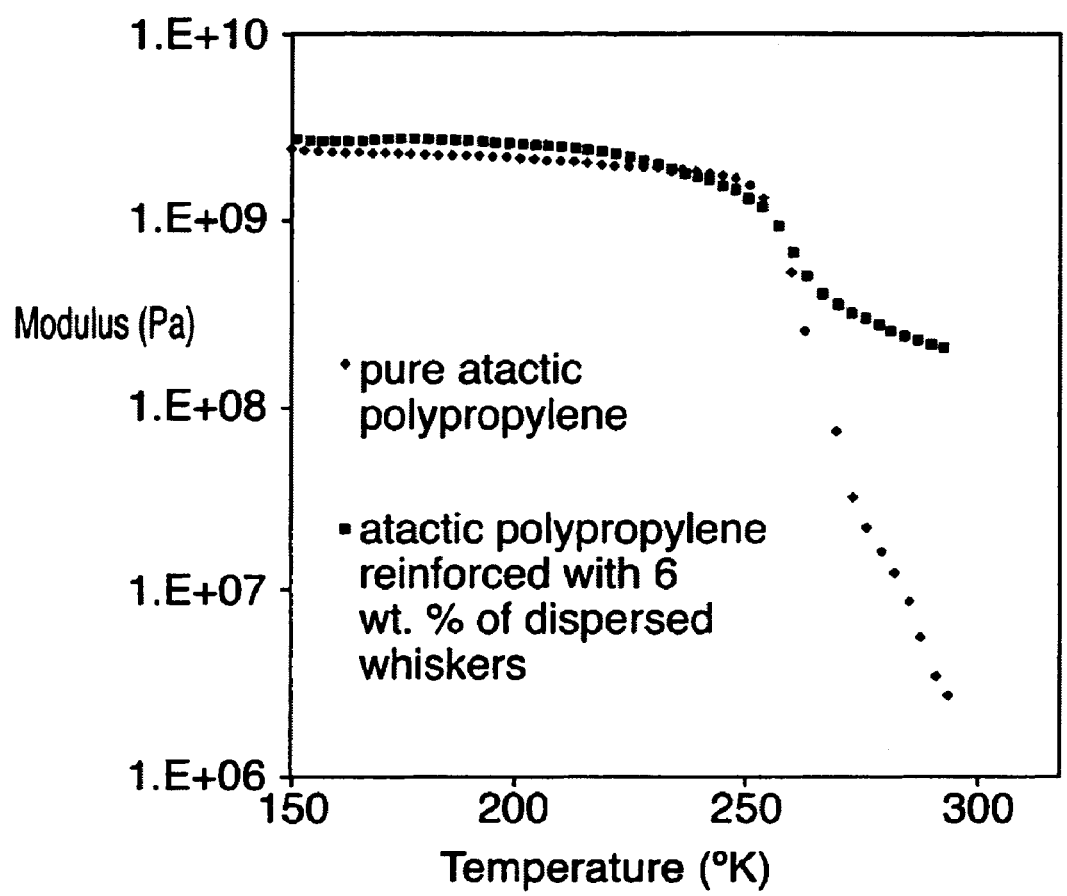
FIG. 1 shows the variation of the elastic modulus E as a function of temperature for the pure material and the material reinforced with 6 wt. % of microcrystals and/or microfibrils (whiskers) of cellulose from a tunicate (see Example 4).

FIG. 1 given later shows the variation of the elastic modulus E as a function of temperature for the pure material and the material reinforced with 6% of whiskers from tunicates.

Example 5

Preparation of a Cholesteric Liquid Crystal in Toluene Starting from a Suspension of Microcrystals from Cotton in Toluene A non-flocculent aqueous suspension of microcrystals from cotton at 2 wt. % is obtained by acid hydrolysis of Whatman No. 1 paper as described by Revol et al. [21].

8 g of the BNA surfactant (from CECCA) is added, with vigorous agitation, to 100 ml of this suspension. The pH is adjusted to 9 by successive addition of a solution of NaOH 1% w/w.

This preparation is freeze-dried, redispersed by passing through the Ultra-Turrax then sonicated in 100 ml of cyclohexane (see Example 1). This preparation is filtered on a Teflon membrane, marketed by Cole-Parmer, with size of 1 μm then centrifuged at 40000 g for 1 h. The pellet is recovered, then redispersed in 5 ml of cyclohexane by sonication for 1 min.

The rather viscous mixture obtained is a stable suspension with a solids content of 43 wt. %. Measurements of the degree of adsorption by differential weighing indicate a surfactant/cellulose ratio of 0.66.

In this case, a suspension is obtained with an actual cellulose content of 26 wt. %. It should be noted that fluid suspensions of cotton microcrystals in water cannot be obtained for contents above 10 wt. %. Above that, the suspensions are in the form of gels.

This suspension is observed by optical microscopy in a capillary (Microslides) with thickness of 200 μm. Placed between crossed polarizers, this suspension has two phases: one is isotropic, and so appears black, and the other is birefringent. The birefringent phase may occur in the form of large domains, or as small drops called tactoids. In both these structures, alternating black and white stripes indicate that this birefringent phase is of the cholesteric type, already observed in aqueous suspensions at much lower concentrations (between 4 and 7% w/w) [4].

The spacing of this cholesteric crystal is approx. 4 μm, which is well below those measured for suspensions in water.

Example 6

Polymerization of Styrene in the Presence of Microcrystals from Tunicates

A dry mixture of microcrystals from tunicates and of BNA surfactant is prepared as described in Example 1.

3.6 g of this mixture is redispersed in 200 ml of styrene, as described in Example 1. The dispersion obtained is centrifuged at 40 000 g for 1 h to remove the excess of surfactant. The pellet is redispersed in 40 ml of styrene and 180 mg of azobisisobutyronitrile (AIBN) as initiator, then placed in a Teflon-coated rectangular mould 8 cm×3 cm. The whole is held at 80° C. for 24 h, then moulded for 10 min at 140° C. under a pressure of 10 MPa.

The results obtained in mechanical testing show a considerable reinforcement effect above the glass transition temperature since the elastic modulus E of the polystyrene is multiplied by a factor of about ten.

Moreover, the presence of just 2% of (microfibrils and/or microcrystals of) cellulose prevents flow of the polymer up to at least 230° C.

FIG. 2 given below shows dynamic mechanical testing of pure polystyrene and polystyrene reinforced with 2% of microcrystals from tunicates.

Example 7

Preparation of a Gel in an Organic Medium Starting from a Suspension

Purification of the microfibrils follows a conventional scheme.

An aqueous suspension of microfibrils from soya was prepared in the manner described below.

After grinding, the soya grains are submitted to the following treatment:
  continuous azeotropic extraction with a toluene-alcohol mixture (38-62),
  two extractions with water,
  extraction with soda 2% w/w,
  bleaching with sodium chlorite,
  homogenization in apparatus of the Waring Blendor type.

Final homogenization for separating the microfibrils is carried out using Manton Gaulin apparatus.

200 to 400 ml of a suspension containing from 1 to 3 wt. % of cellulose in water is introduced. The suspension is submitted to successive passes for a period of time ranging from 1 h to 1 h 30. The suspension obtained is very pasty and does not flow.

The concentration of this suspension is adjusted to 0.3% by adding distilled water.

100 ml of a 3 wt. % solution of the BNA surfactant (obtainable from the CECCA company) is added to 100 ml of this suspension. The pH of the mixture is adjusted to 9 by successive additions of a soda solution at 1% w/w. The whole is freeze-dried for 24 h and gives a sticky white powder.

This dry mixture is redispersed in 5 ml of toluene using apparatus of the Ultra-Turrax type.

A gel is thus obtained that contains 6% of cellulose and that does not flow when the container is inverted.

REFERENCES

[1] R. H. Marchessault, F. F. Morehead and N. M. Walter, Nature, 1959, 184: p. 632.
[2] U.S. Pat. No. 4,483,743, A. F. Turbak, *Microfibrillated cellulose*, 1984: USA.
[3] FR 95 01460, E. Dinand, M. R. Vignon, H. Chanzy, I. Vincent et A. Maureaux, *Cellulose microfibrillee et son procédé d'obtention à partir des pulpes de betteraves sucrières*, 1995: France.
[4] J. -F. Revol, H. Bradford, J. Giasson and D. J. Gray, *Helicoidal self-ordering of cellulose microfibrils in aqueous suspension*. Int. J. Biol. Macromol., 1992, 14: p. 170–171.
[5] X. M. Dong, T. Kimura, J. -F. Revol and D. G. Gray, *Effects of ionic strength on the isotropic-chiral nematic phase transition of suspensions of cellulose crystallites*. Langmuir, 1996, 12 (8): p. 2076–2082.
[6] E. Dinand, H. Chanzy and M. R. Vignon, *Parenchymal cell cellulose from sugar beet pulp: preparation and properties*. Cellulose, 1996, 3: p. 183–188.
[7] PCT Int. Appl. WO 95 23,824, V. Favier, J. Y. Cavaillé, H. Chanzy and B. Ernst, *Polymers reinforced with cellulose microfibrils*, . 1995, Elf Atochem: France.
[8] U.S. Pat. No. 5,629,055, J. -F. Revol, L. Godbout, L. Donat and D. G. Gray, *Solidified liquid crystals of cellulose with optically variable properties*, 1997, Pulp and Paper Research Institue of Canada: Canada.
[9] FR 2,751,981 (WO 98/02499), B. Langlois, *Fluide comprenant des microfibrilles de cellulose et son application pour lexploitation de gisements pétroliers*, 1996, Rhone Poulenc Chimie: France.
[10] FR 2,744,632, J. Mondet, *Utilisation d'une suspension aqueuse de microfibrilles d'origine naturelle pour la préparation de compositions cosmetiques ou dermatologiques, compositions cosmetiques ou dermatologiques et applications.*, 1997, L'Oréal : France.
[11] FR 2 739 394 (WO 97/12954), V. Guillou, *Formulations détartrantes et nettoyantes à base de microfibrilles de cellulose*, 1995, Rhone Poulenc Chimie : France.
[12] U.S. Pat. No. 4,923,981, M. K. Weibel and C. D. Myers, *Use of parenchymal cellulose to improve comestibles*, 1989: USA.
[13] U.S. Pat. No. 4,659,388, S. Innami and Y. Fukui, *Additive composition for foods or drugs*, 1987: Japan.
[14] A. F. Turbak, F. W. Snyder and K. R. Sandberg, *Microfibrillated cellulose, a new cellulose product: properties, uses and commercial potential*. J. Appl. Polym. Sci.: Appl. Polym. Symp., 1983, 37: p. 815–827.
[15] PCT Int. Appl. WO 97 12,917, J. -Y. Cavaillé, H. Chanzy, E. Fleury and J. -F. Sassi, *Surface-modified* cellulose microfibrils, method for making same, and use thereof as a filler in composite materials, 1997, Rhone-Poulenc Chimie : France.

[16] U.S. Pat. No. 4,144,122, J. G. Emanuelsson and S. L. Wahlen, *Quaternary ammonium compounds and treatment of cellulose pulp and paper therewith*, 1979, Berol Kemi AB: Sweden.

[17] FR 2,759,376, R. Ralairina, R. De Baynast, J. Desbrières and M. Rinaudo, *Procédé pour obtenir des microfibrilles de celluloses cationiques ou leurs dérivés soluble, ainsi que celluloses obtenues par ce procédé*, 1997: France.

[18] FR 2,750,994 (WO 98/02486), J. Benchimol, G. Guerin, I. Vincent, R. Cantiani and A. Senechal, *Additivation de microfibrilles de cellulose avec de la cellulose carboxylée à bas degré de substitution*, 1996: France.

[19] FR 2,751,659 (WO 98/02487), J. Benchimol, G. Guerin, I. Vincent, R. Cantiani and A. Senechal, *Additivation de microfibrilles de cellulose avec de la cellulose carboxylée à haut degré de substitution*, 1996: France.

[20] V. Favier, H. Chanzy and J. -Y. Cavaillé, *Polymer Nanocomposites Reinforced by cellulose Whiskers*. Macromolecules, 1995 , 28: p. 6365–6367.

[21] J. -F. Revol, L. Godbout, X. -M. Dond and D. G. Gray, *Chiral nematic suspension of cellulose crystallites; phase separation and magnetic field orientation*. Liquid Crystals, 1994, 16: p. 127–134.

[22] J. -F. Revol and R. H. Marchessault, Int. J. Biol. Macromol., 15, 329–335, 1993.

[23] U.S. Pat. No., 4,286,087 Austin et al., Aug. 25, 1981.

[24] Chanzy H. and Vuong R., Journal of Microscopy, 1977, 11, p. 143–150.

[25] Chanzy H. and Vuong R. in <<Polysaccharides: Topics in Structure and Morphology>>, Atkins, E.D.T Editor, MacMillan, London, 1985.

[26] WO 93/10172, Smith B. C., Goudswaard I., Chanzy H., Cartier N., <<Thermosetting plastic and cellulose fiber composition>>, 1993.

What is claimed is:

1. A colloidal dispersion, in an organic solvent, of microfibrils and/or microcystal of a fibrillar organic substance selected from the group consisting of cellulose, chitin, and polysaccharides containing in addition at least one compound possessing a hydrophilic part and a hydrophobic part.

2. A dispersion of claim 1, wherein the compound possessing a hydrophilic part and a hydrophobic part is selected from the group consisting of surfactant, a stabilizing polymer, a co-surfactant and mixtures thereof.

3. A dispersion of claim 1 of microfibrils and/or microcrystals of cellulose.

4. A dispersion of claim 1 wherein the organic solvent has a dielectric constant that is less than or equal to approximately 37.5, and/or the organic solvent is selected from the group consisting of
   aliphatic hydrocarbons,
   aromatic hydrocarbons,
   chlorine-containing solvents,
   ketones having 3 to 10 carbon atoms,
   polymerizable vinylic compounds,
   epoxides,
   primary, secondary or tertiary amines,
   alkyl acetates having 1 to 10 carbon atoms,
   ethers with an alkyl chain having of 1 to 20 carbon atoms or an aromatic chain,
   aldehydes, carboxylic acids and/or their acylated derivatives and anhydrides, the polyacids with an alkyl chain having 1 to 20 carbon atoms or an aromatic chain,
   primary, secondary or tertiary alcohols, with aliphatic chain of 1 to 10 carbon atoms, and/or aromatic chain,
   tetrahydrofuran (THF), pyridine, dimethylformamide, (DMF), dimethylacetamide (DMAc),
   mineral and/or organic oils, of synthetic or natural origin,
   or mixtures thereof.

5. A dispersion of claim 1 wherein the quantity of cellulose varies from about 0.01 wt % to about 50 wt % relative to the total weight of the dispersion.

6. A dispersion of claim 1 wherein the compound possessing a hydrophilic or hydrophobic part is:
   (a) a surfactant possessing:
      a hydrophilic part capable of being adsorbed on the microfibrils and/or microcyrstals of the compound selected from the group consisting of cellulose, chitin and polysaccharides and containing oxyethylene groups,
      a hydrophobic part, containing a carbon chain of at least 6 carbon atoms, aromatic or non-aromatic, and capable of interacting with the solvent,
      the said surfactant being selected from the group consisting of
         cationic surfactants,
         anionic surfactants,
         amphoteric surfactants possessing a quaternary ammonium group and an anionic phosphoric group, and
         neutral surfactants,
   (b) or, a stabilizing polymer possessing from about 5 to about 200 hydrophilic units and from about 10 to about 200 hydrophobic units.

7. A dispersion of claim 2 wherein the co-surfactant possesses:
   a hydrophilic part that is compatible with the hydrophilic part of the compound possessing a hydrophilic part and a hydrophobic part, and
   a hydrophobic part that is compatible with the hydrophobic part of the compound possessing a hydrophilic part and a hydrophobic part,
   the co-surfactant making it possible, for the microfibrils and/or microcrystals of the fibrillar organic substance as defined in claim 1 to be rendered compatible with the organic solvent,
   the said co-surfactant being selected from the group consisting of alcohols having 4 to 18 carbon atoms, carboxylic acids having 4 to 18 carbon atoms, aldehydes having from 4 to 18 carbon atoms or amines having from 4 to 18 carbon atoms.

8. A dispersion of claim 1 containing:
   cellulose microfibrils and/or microcrystals, in a quantity varying from about 0.01 wt % to about 50 wt % relative to the total weight of the dispersion,
   an organic solvent in a quantity varying from about 50 wt % to about 99.9 wt % relative to the total weight of the dispersion,
   a surfactant in a quantity varying from about 0.01 wt % to about 50 wt % relative to the total weight of the dispersion,
   and optionally a co-surfactant in a quantity varying from about 0 wt % to about 20 wt % relative to the total weight of the dispersion.

9. A dispersion of claim 1 wherein it exhibits at least one of the following properties:
   it does not form aggregates (it is non-flocculent),
   it is birefringent in shear, and it is stable for periods ranging from at least one minute to at least 12 months.

10. A method of preparation of a dispersion of claim 1 comprising:
(1) forming an aqueous dispersion of microfibrils and/or microcrystals of a fibrillar organic substance selected from the group consisting of cellulose, chitin, and polysaccharide with a compound possessing a hydrophilic part and a hydrophobic part selected from the group consisting of a surfactant, a stabilizing polymer, a co-surfactant or mixtures thereof,
(2) removing the water from the aqueous dispersion as obtained in the preceding stage to obtain a dry mixture of surfactant and/or of stabilizing polymer and optionally co-surfactant, and a fibrillar organic substance selected from the group consisting of cellulose, chitin, and polysaccharides,
(3) and dispersing the mixture as obtained in the preceding stage in an organic solvent.

11. The method of preparation of claim 10, wherein
(1) an aqueous dispersion of microfibrils and/or microcrystals of cellulose is mixed with a surfactant selected from the group consisting of BNA,
polyoxyethylene sorbitan trioleate and didecyidimethyl ammonium bromide, the weight ratio between the said surfactant and said microfibrils and/or microcrystals of cellulose varying from about 0.1:1 to about 20:1, to obtain an aqueous colloidal dispersion of microfibrils and/or of microcrystals of cellulose,
(2) the water is eliminated from the aqueous dispersion as obtained in the preceding stage to obtain a dry mixture of surfactant and cellulose, the said mixture containing from about 5 wt % to about 95 wt % of surfactant relative to the total weight of the mixture, and from about 5 wt % to about 95 wt % of cellulose relative to the total weight of the mixture,
(3) the mixture as obtained in the preceding state is dispersed in an organic solvent as defined in claim 4,
until a dispersion of cellulose microfibrils and/or microcrystals is obtained for which the percentage by weight of adsorption between the said surfactant and the said cellulose microfibrils and/or microcrystals varies from about 0.1 to about 20.

12. An organic solvent having a dielectric constant that is less than or equal to approximately 37.5 and/or the organic solvent is selected from the group consisting of
aliphatic hydrocarbons,
aromatic hydrocarbons,
chlorine-containing solvents,
ketones having 3 to 10 carbon atoms,
polymerizable vinylic compound,
epoxides,
primary, secondary or tertiary amines,
alkyl acetates having 1 to 10 carbon atoms,
ethers with an alkyl chain having 1 to 20 carbon atoms or an aromatic chain,
aldehydes, carboxylic acids and/or their acylated derivatives and anhydrides, the polyacids with an alkyl chain having 1 to 20 carbon atoms or an aromatic chain,
primary, secondary or tertiary alcohols, with an aliphatic chain having 1 to 1-carbon atoms, and/or an aromatic chain,
tertrahydrofuran (THF), pyridine, dimethylformamide (DMF), dimethylacetamide A(DMAc),
mineral and/or organic oils of synthetic or natural origin, or mixtures thereof,
wherein it is thickened and/or viscous, and containing:
microcrystals and/or microfibrils of a fibrillar organic substance selected from the group consisting of cellulose, chitin, and polysaccharides,
a compound possessing a hydrophilic part and a hydrophobic part selected from the group consisting of a surfactant, a stabilizing polymer, a co-surfactant and mixtures thereof.

13. A colloidal dispersion of claim 1 wherein the polysaccharide is selected from the group consisting of β1→3 glucan, β1→3 xylan and β1→4 mannan.

14. A colloidal dispersion of claim 2 wherein the compound possessing a hydrophilic part and a hydrophobic part is a mixture of surfactant and co-surfactant.

15. In a gel, liquid crystal or material containing cellulose microfibrils and/or microcrystals, the improvement comprising using an aqueous dispersion of claim 1.

16. In a preparation of a material containing microfibrils and/or microcrystals of cellulose, the improvement comprising using a dried mixture of the composition of claim 15.

* * * * *